(12) United States Patent
Fannasch et al.

(10) Patent No.: US 7,158,145 B1
(45) Date of Patent: Jan. 2, 2007

(54) METHOD FOR APPLYING COLORED INFORMATION ON AN OBJECT

(75) Inventors: Lothar Fannasch, Bielefeld (DE); Dirk Fischer, Paderborn (DE); Michael Hennemeyer-Schwenker, Herbram (DE)

(73) Assignee: Orga Systems GmbH, Paderborn (DE)

( * ) Notice: Subject to any disclaimer, the term of this patent is extended or adjusted under 35 U.S.C. 154(b) by 422 days.

(21) Appl. No.: 10/130,540

(22) PCT Filed: Sep. 14, 2000

(86) PCT No.: PCT/DE00/03188

§ 371 (c)(1), (2), (4) Date: Aug. 20, 2002

(87) PCT Pub. No.: WO01/36208

PCT Pub. Date: May 25, 2001

(30) Foreign Application Priority Data

Nov. 18, 1999 (DE) ................................ 199 55 383

(51) Int. Cl.
*G09G 5/02* (2006.01)
(52) U.S. Cl. ........................ 345/589; 345/581; 345/593; 345/597
(58) Field of Classification Search ................ 345/581, 345/589, 593, 597
See application file for complete search history.

(56) References Cited

U.S. PATENT DOCUMENTS 5,296,958 A * 3/1994 Roddy et al. ................ 359/204
5,983,057 A * 11/1999 Matsuo et al. .............. 399/207
6,122,106 A * 9/2000 Noyes et al. ................ 359/618

FOREIGN PATENT DOCUMENTS

| DE | 34 45 751 C2 | 8/1985 |
|---|---|---|
| DE | 38 34 783 A1 | 4/1990 |
| DE | 41 08 118 C2 | 9/1991 |
| DE | 691 04 968 T2 | 11/1991 |
| DE | 40 26 130 A1 | 2/1992 |
| DE | 44 08 111 A1 | 9/1994 |
| EP | 0 538 044 A2 | 4/1993 |
| WO | WO 96/35585 A1 | 11/1996 |
| WO | WO 97/21550 A1 | 6/1997 |

* cited by examiner

*Primary Examiner*—Kee M. Tung
*Assistant Examiner*—Tam Tran
(74) *Attorney, Agent, or Firm*—Foley & Lardner LLP

(57) ABSTRACT

A description is given of a method for applying colored information to an object (4), the object having at least two different chromophoric particles, at least in a layer (4A) close to the surface, which change the color of this layer (4A) under the influence of laser radiation,
laser radiation (1, 2, 3) having at least two different wavelengths ($\lambda_1$, $\mu_2$, $\lambda_3$) being used in order to change the color of this layer (4A),
the object (4) being acted on by laser radiation in the vector and/or raster method by means of a two-coordinate beam deflection device (6) and a focusing device (7) for focusing the laser radiation onto the layer (4A) of the object (4).

Figure 1:
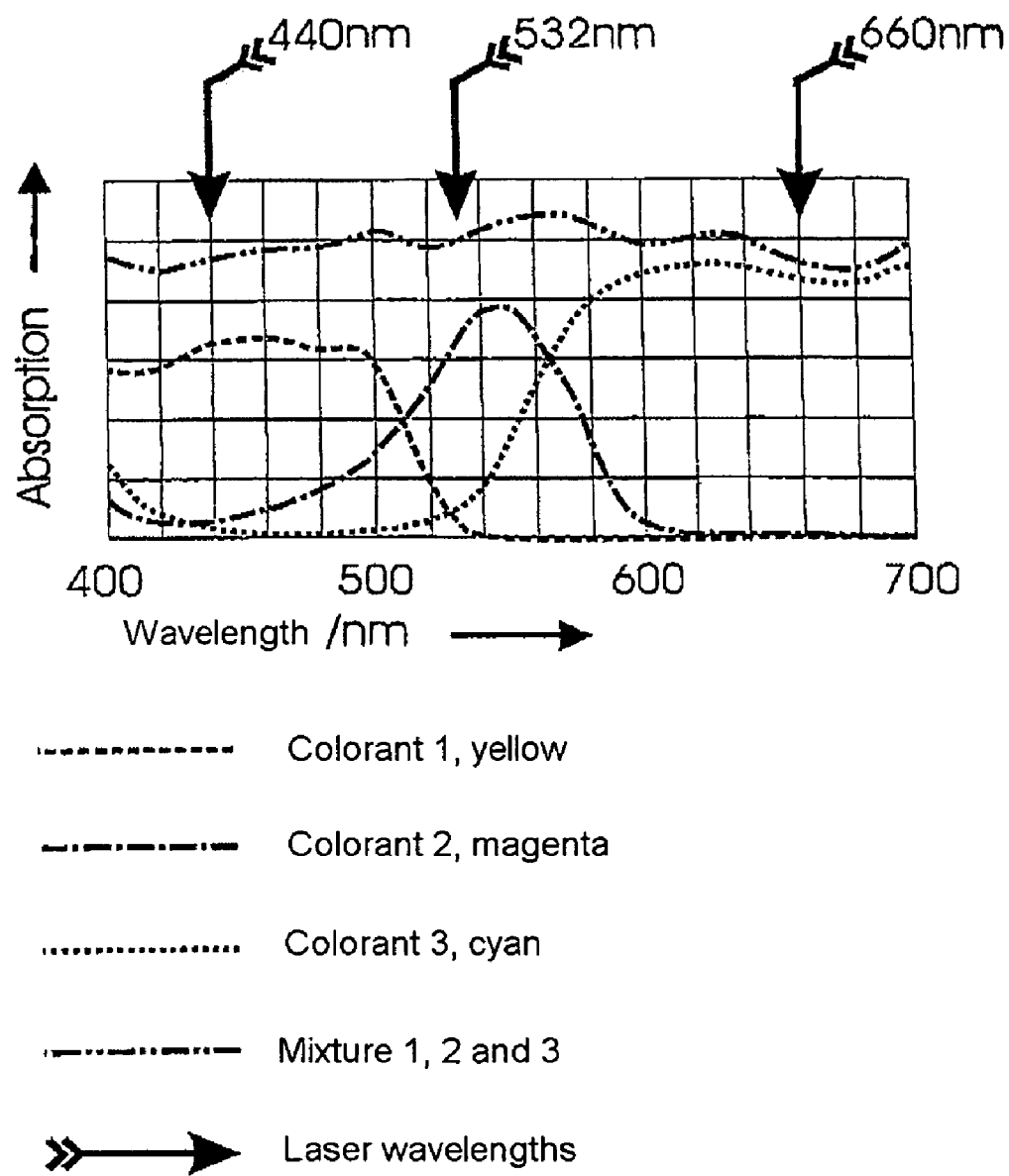

According to the invention, at least one beam guiding means (8) is provided in order to guide a first laser beam (1) having the wavelength ($\lambda_1$) and at least one further laser beam (2) having a wavelength ($\lambda_2$), which is different from the wavelength of the first laser beam, via the two-coordinate beam deflection device (6) and the focusing device (7) onto the layer (4A) of the object (4).

20 Claims, 13 Drawing Sheets

| P1 | $(x_1 + \Delta x_1^{(1)} / y_1 + \Delta y_1^{(1)} / I_1^{(1)})$; $(x_1 + \Delta x_1^{(2)} / y_1 + \Delta y_1^{(2)} / I_1^{(2)})$; $(x_1 + \Delta x_1^{(3)} / y_1 + \Delta y_1^{(3)} / I_1^{(3)})$ |
|---|---|
| P2 | $(x_2 + \Delta x_2^{(1)} / y_2 + \Delta y_2^{(1)} / I_2^{(1)})$; $(x_2 + \Delta x_2^{(2)} / y_2 + \Delta y_2^{(2)} / I_2^{(2)})$; $(x_2 + \Delta x_2^{(3)} / y_2 + \Delta y_2^{(3)} / I_2^{(3)})$ |
| .... | |
| .... | |

METHOD FOR APPLYING COLORED INFORMATION ON AN OBJECT

The invention relates to a method for applying colored information to an object. For this type of method, the object has at least two different chromophoric particles, at least in a layer close to the surface, which change the color of this layer under the influence of laser radiation. In this case, laser radiation having at least two different wavelengths ($\lambda_1$, $\lambda_2$, $\lambda_3$) is used to change the color of this layer. The object is acted on by laser radiation in the vector and/or raster method by means of a two-coordinate beam deflection device and a focusing device. In this case, the focusing device focuses the laser radiation on the layer of the object which contains the chromophoric particles. Here, a change in the color in each case takes place locally (at the laser focus) at the locations of the object envisaged for colored information.

DE 30 48 736 C2 discloses labeling plastic cards by means of laser radiation, the plastic cards containing specific laser additives as chromophoric particles for the purpose of this labeling, at least in a layer close to the surface. One example of such a laser additive is the laser additive bearing the market designation Iriodin LS 825 from the Merck company. This pigment is intrinsically transparent to light gray. As a result of acting on this laser additive with laser radiation at 1064 nm (Nd-YAG laser), an intensive, irreversible color-changing reaction is triggered in the plastic. The reaction generally primarily effects a dark coloration (blackening) of the plastic, brought about as a result of carbonization of the plastic polymer matrix. In this case, the laser additive effects the absorption of the laser radiation necessary for the carbonization, use being made of laser additives whose absorption is matched to a corresponding laser wavelength.

Furthermore, it is known to use latent pigments, as they are known, which are intrinsically at least virtually transparent as chromophoric particles. When acted on by laser radiation, the absorption property of the latent pigment is, however, changed in such a way that the pigment exhibits absorption in the visible spectral range following the laser irradiation, which brings about a change in the color of the layer in which this pigment is located.

Furthermore, WO 96/35585 discloses a method for applying colored information in which three different pigments are used as chromophoric particles, which in each case absorb light at least at one point (for a specific wavelength or wavelength range) in the visible spectral range (400 nm to 700 nm). Under irradiation with intensive laser radiation having a specific wavelength, preferably the wavelength where the absorption of the pigment is most intense, these pigments lose their absorption property, at least partially. In this way, they may be bleached, at least partially. By means of wavelength-selective bleaching by means of laser radiation, the setting of a color can be carried out locally in this way.

Ideally, the layer to which the colored information is to be applied has the following pigments (colorants):
- a first pigment, which primarily absorbs blue light (440 nm)—the inherent color of this pigment is yellow,
- a second pigment, which primarily absorbs green light (532 nm)—the inherent color of this pigment is red (magenta),
- a third pigment, which primarily absorbs red light (660 nm)—the inherent color of this pigment is blue (cyan).

If these pigments are present in a layer distributed equally in virtually equal concentrations, then this layer appears black when viewed in sunlight. By means of wavelength-selective bleaching of the individual pigments by means of laser radiation, it is in this way possible to set the color of the layer specifically by means of subtractive color mixing. If, for example, the layer is irradiated at a point with laser radiation at 440 nm and the first pigment is bleached completely, then a layer is obtained which no longer absorbs blue light but only green and red light. The color impression at this point then corresponds to this.

In order with the aid of this method to be able to set the color over a wide range, it is necessary to act on the appropriate layer of the object with laser radiation of different wavelengths.

For this purpose, WO 96/35585 proposes the use of a tunable laser, which is capable of producing laser radiation of different wavelengths. The object is acted on by laser radiation in the vector and/or raster method by means of a two-coordinate beam deflection device and a focusing device. In this case, the focusing device focuses the laser radiation onto the layer of the object which contains the chromophoric particles. One problem in this case is, however, that the intensity of tunable lasers is often too low. In addition, the operating state of tunable lasers is often not stable, since these lasers depend very sensitively on external conditions. Continuous operation under production conditions cannot be achieved with a tunable laser.

Furthermore, WO 96/35585 proposes to use three different laser systems to apply colored information to an object—one laser system for each wavelength. In this case, the first pigment is bleached in a first method step. The object then has to be transported onward to the second laser system, where the second pigment is then bleached, and so on. However, this entails some disadvantages. Firstly, the transport of the object from one laser system to the next is complicated and time-consuming. Furthermore, the object has to be repositioned in each laser system, which is very difficult, since the positioning accuracy is determined by the size of the pixels (about 50 to 100 µm) of the information to be applied. Secondly, each laser system requires its own two-coordinate beam deflection device and an associated focusing device, in order to be able to act on the object in the vector and/or raster method.

It is an object of the invention to provide a method for applying colored information to an object by means of laser radiation of different wavelengths which can be carried out simply, reliably and quickly.

According to the invention, this object is achieved by the characterizing features of patent claim 1. The subclaims which then follow contain advantageous embodiments of the method.

According to the invention, at least one beam guiding means is provided in order to guide a first laser beam having the wavelength ($\lambda_1$) and at least one further laser beam having a wavelength ($\lambda_2$), which is different from the wavelength of the first laser beam, via the two-coordinate beam deflection device and the focusing device onto the layer of the object in which the chromophoric particles are located.

As compared with the use of a tunable laser, the method according to the invention has the advantage that a dedicated, stable powerful laser radiation source can be used to generate the laser radiation for each laser wavelength. By means of the beam guiding means provided according to the invention, the laser beams of different wavelengths, running physically separate from one another because of their different generation locations, are aimed by means of the one two-coordinate beam deflection device and the one focusing device onto the layer of the object to be labeled.

As compared with the use of three different laser systems, the method according to the invention has the advantage that the object does not have to be transported from one laser system to the next in order to be acted on with laser radiation of a different wavelength. Handling systems for the onward transport of the object from one laser system to the next are dispensed with. In addition, time is saved because of the omission of the transport. In particular, there are no positioning problems on account of the onward transport.

Figure 2:
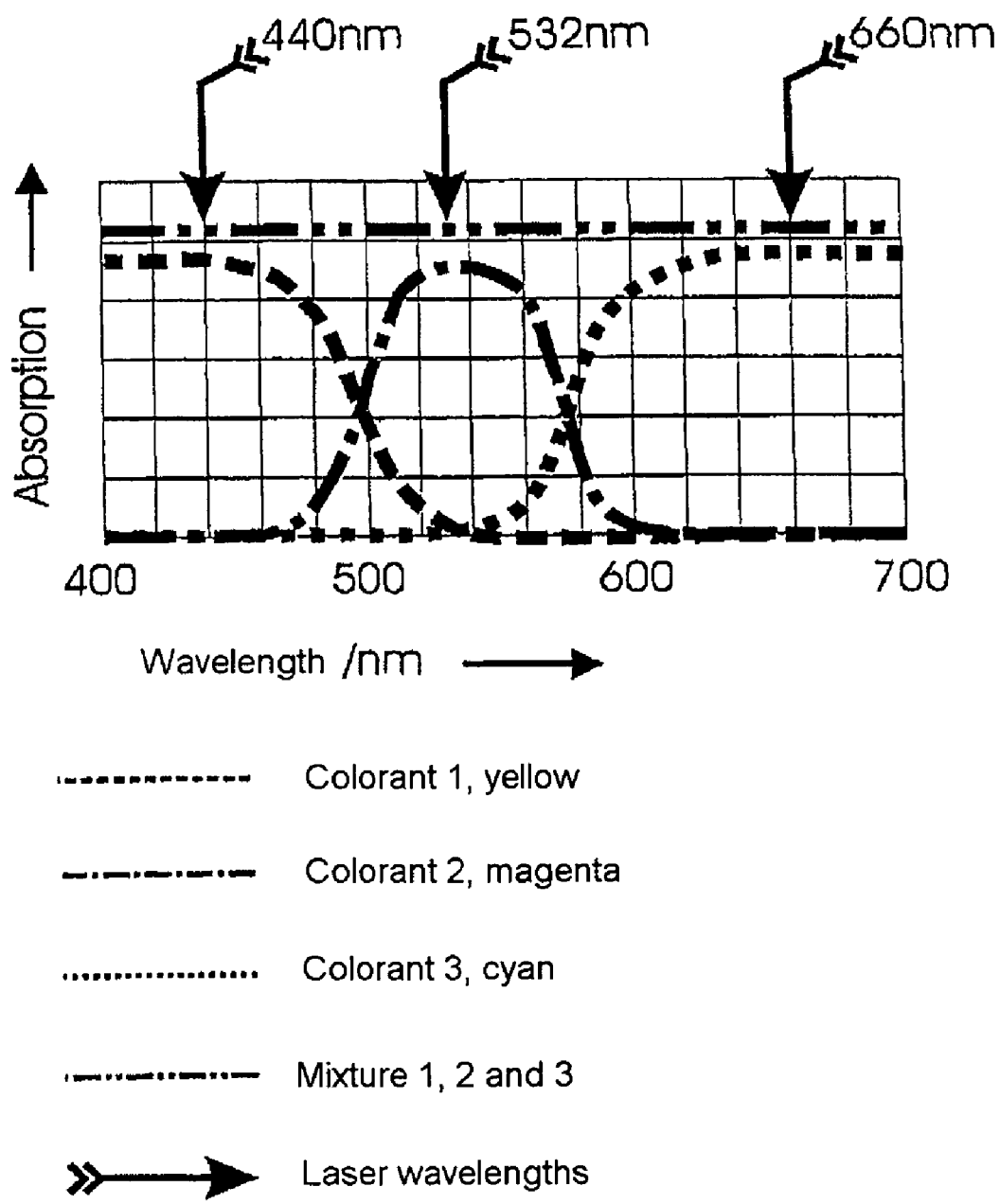
Figure 3:
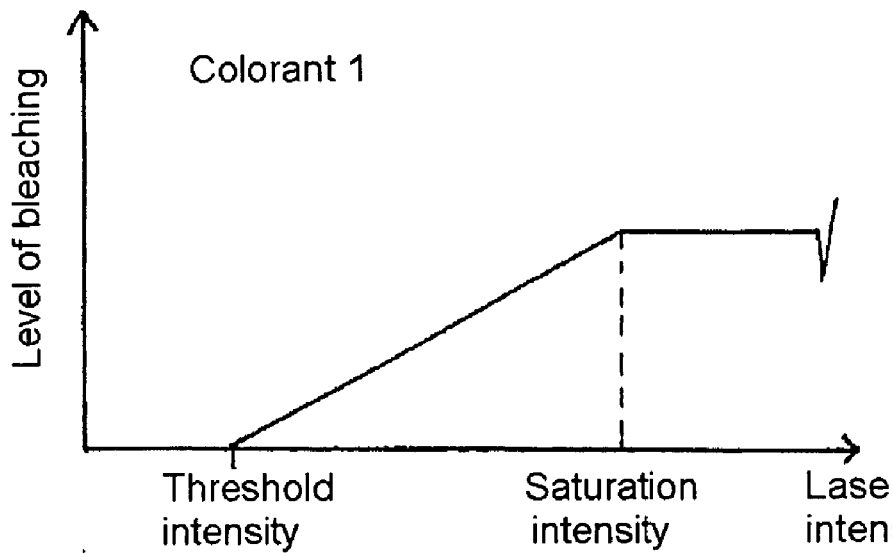
Figure 4:
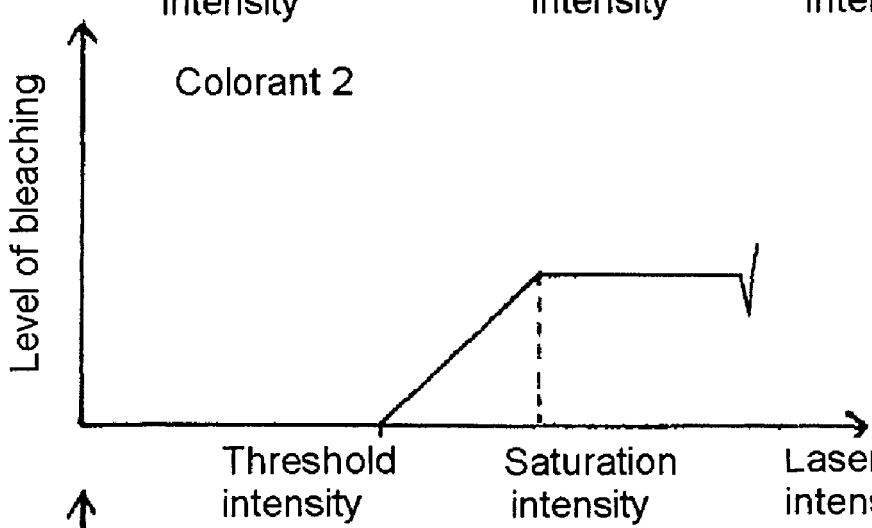
Figure 5:
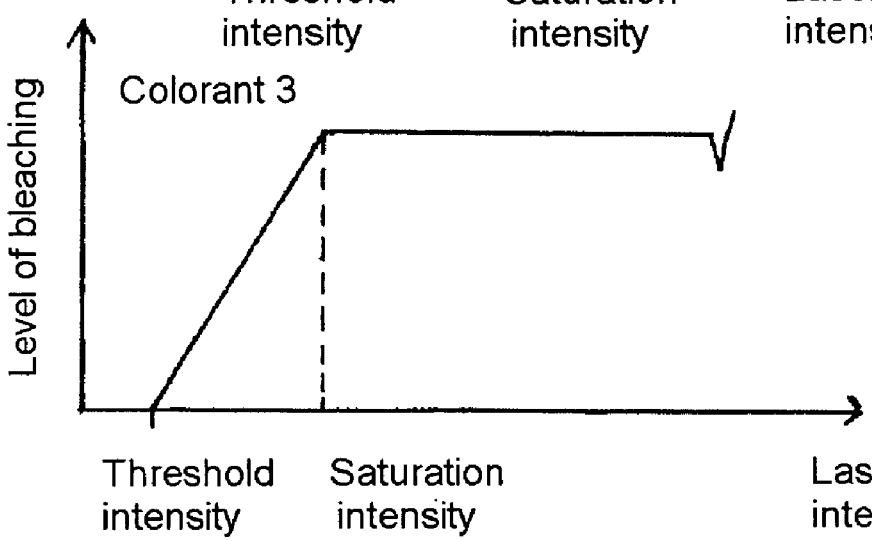
Figure 6:
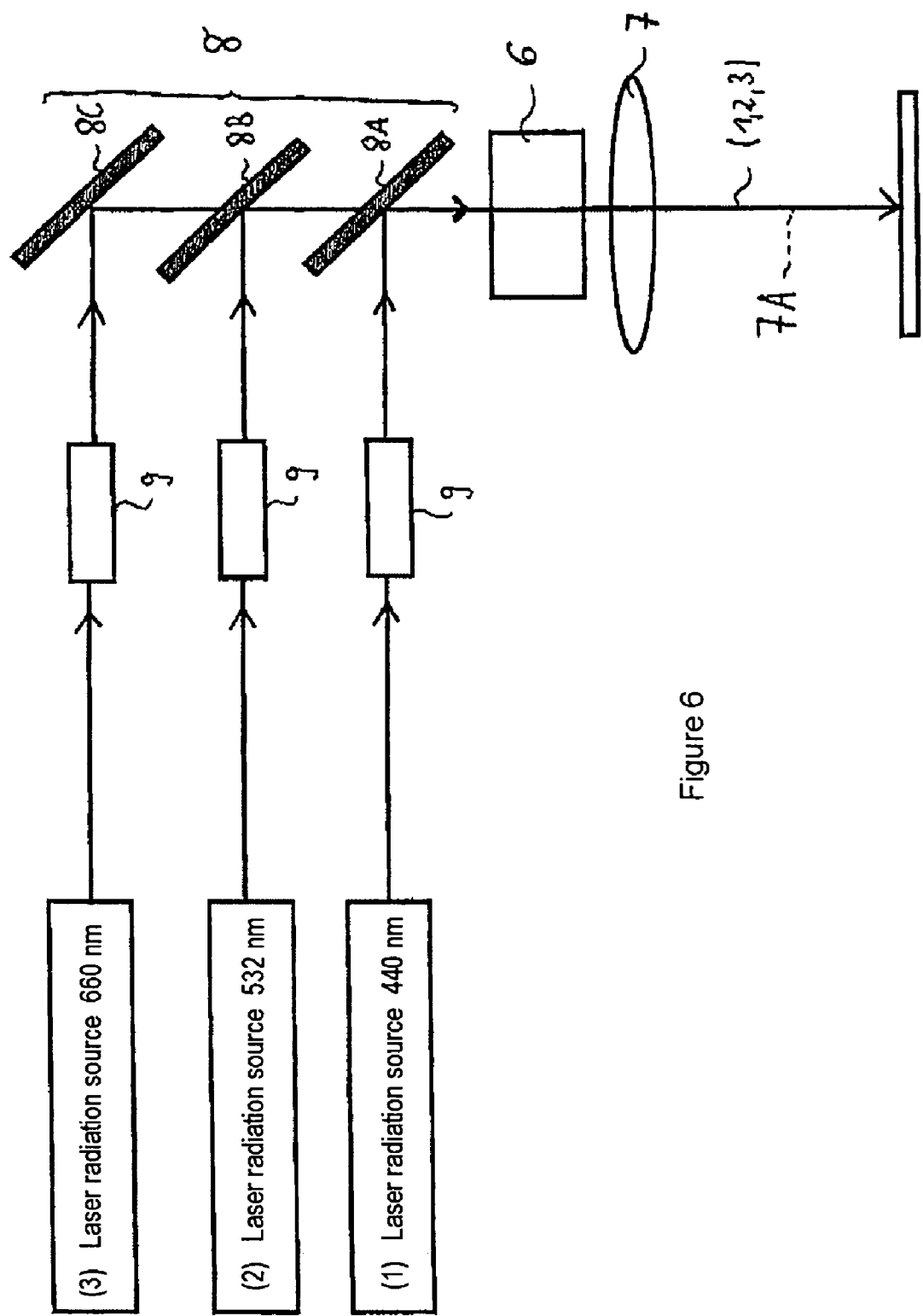
Figure 7:
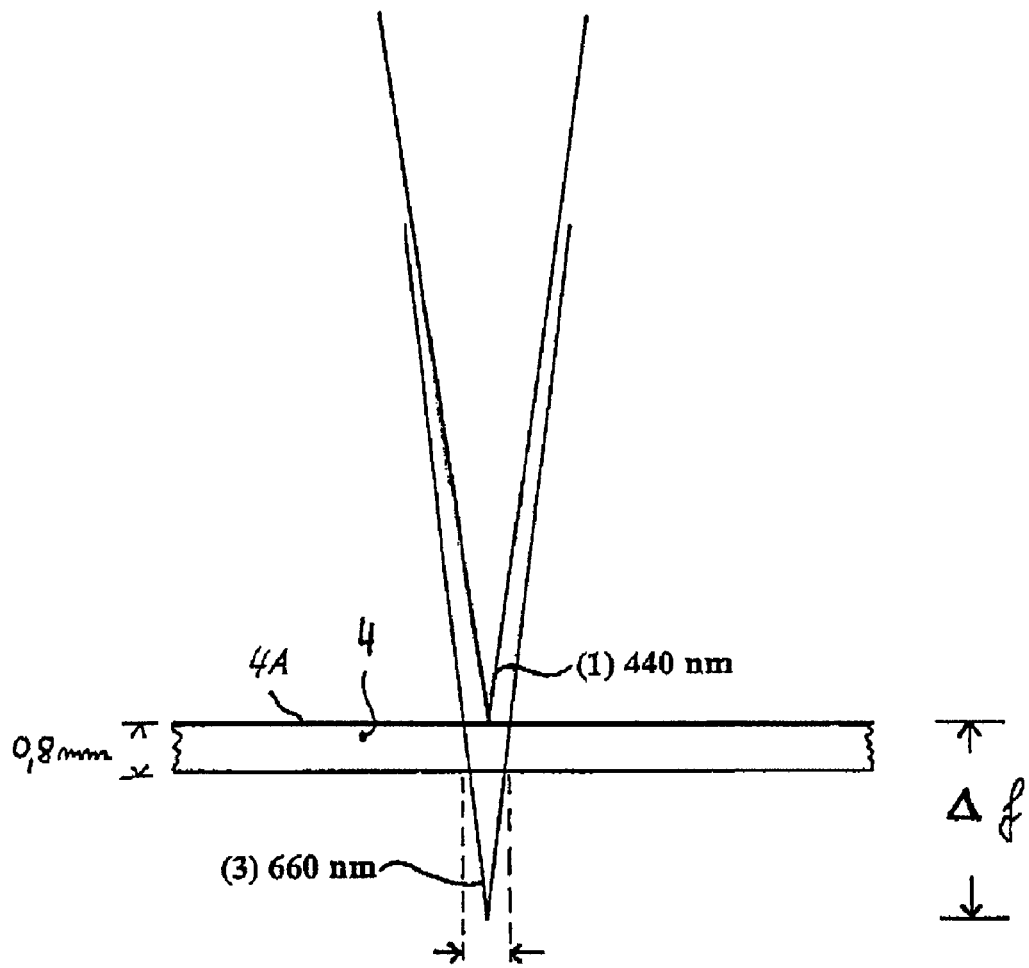
Figure 8:
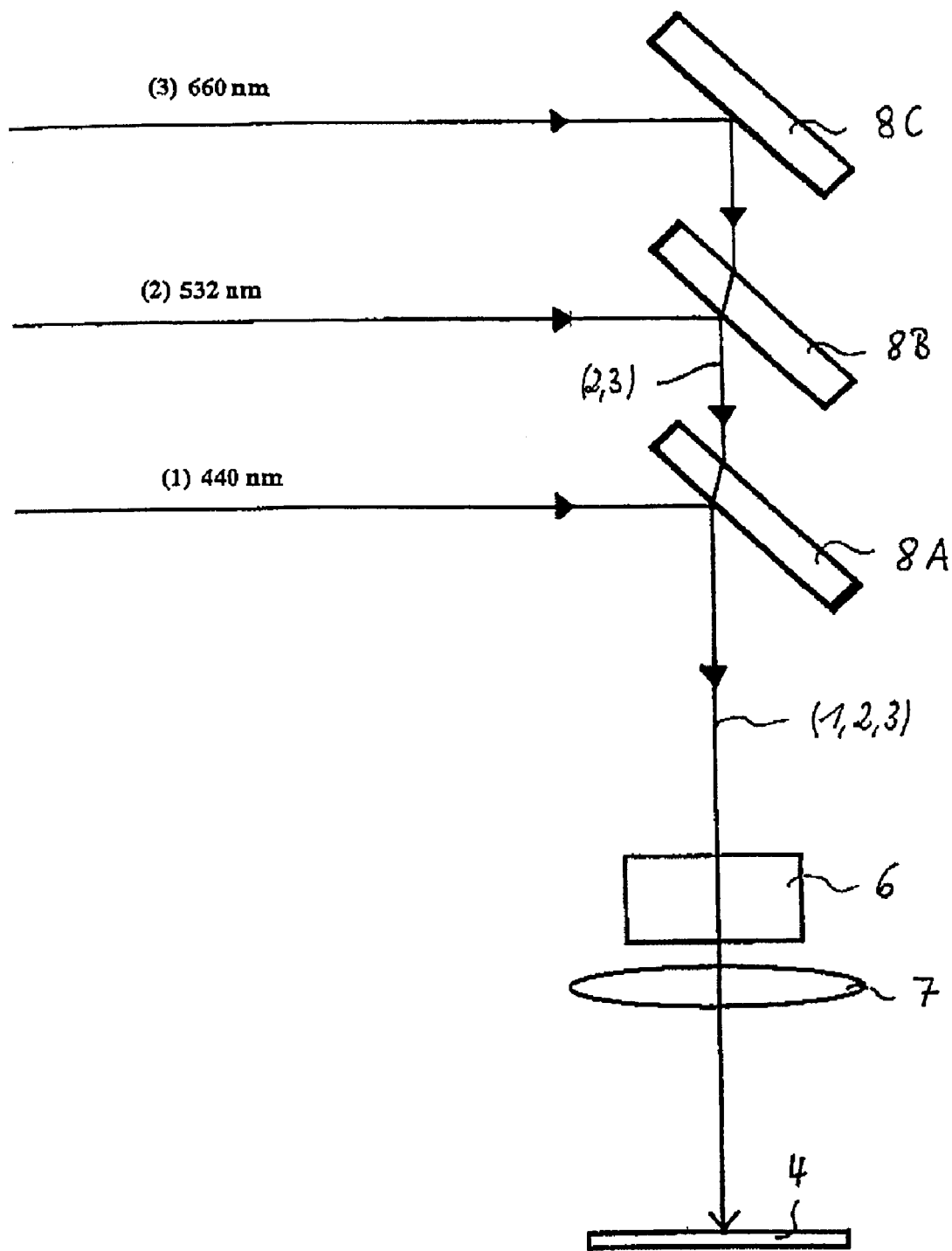
Figure 9:
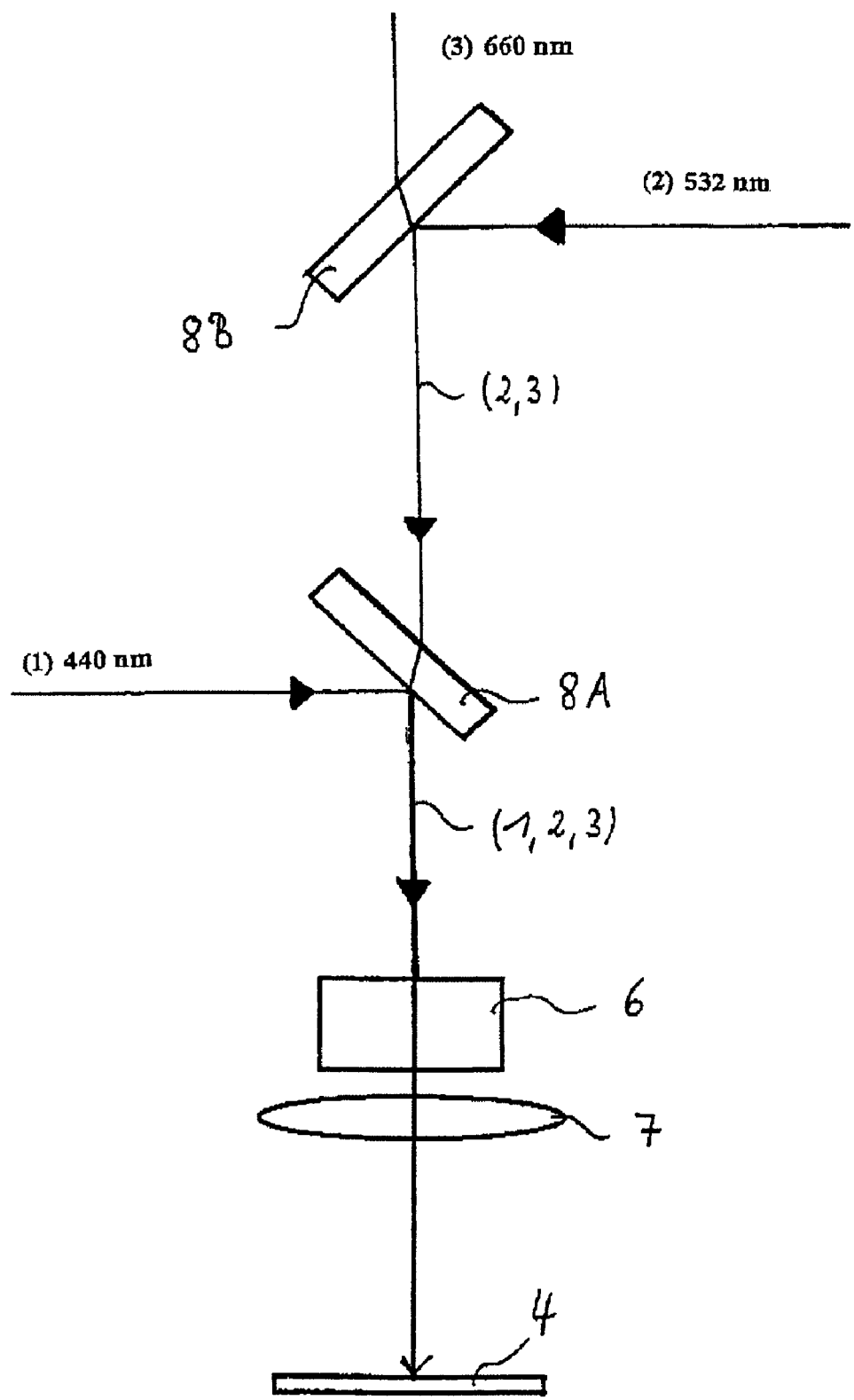
Figure 10:
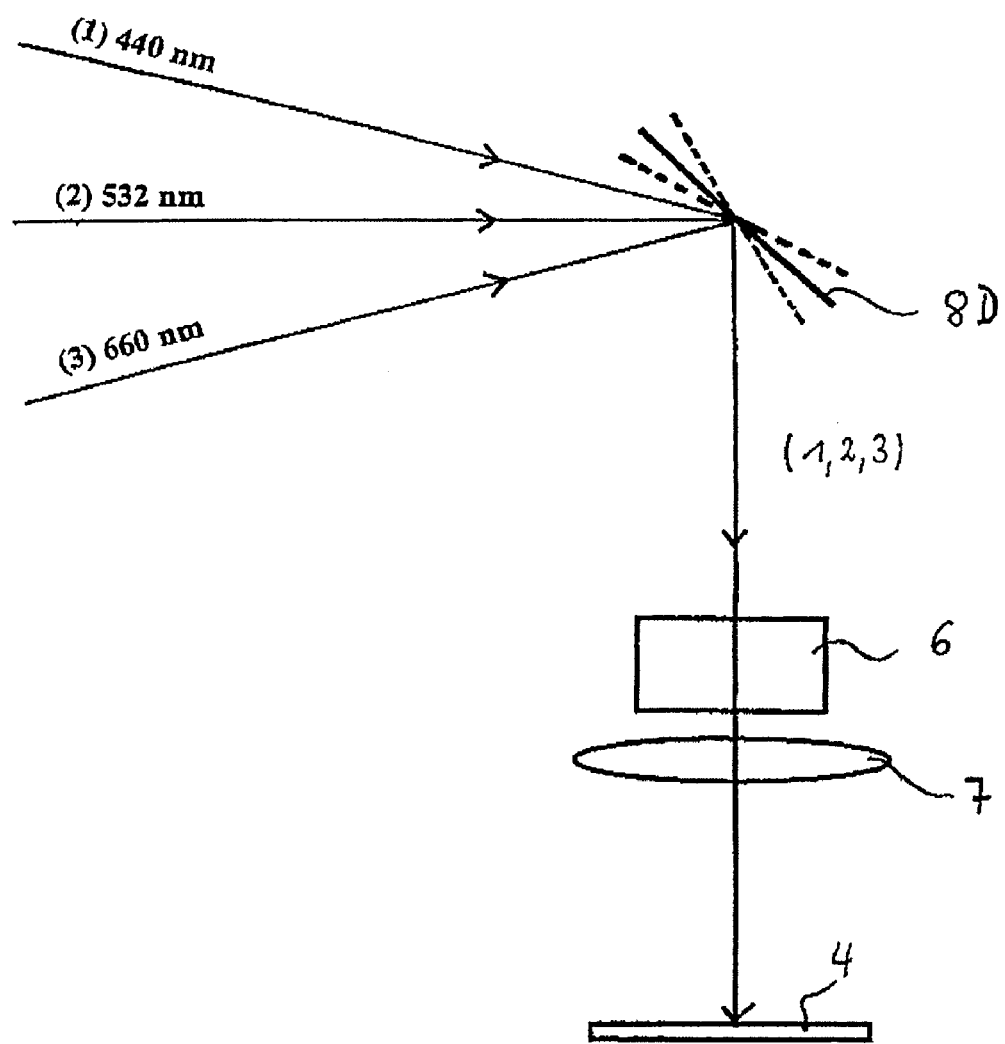
Figure 11:
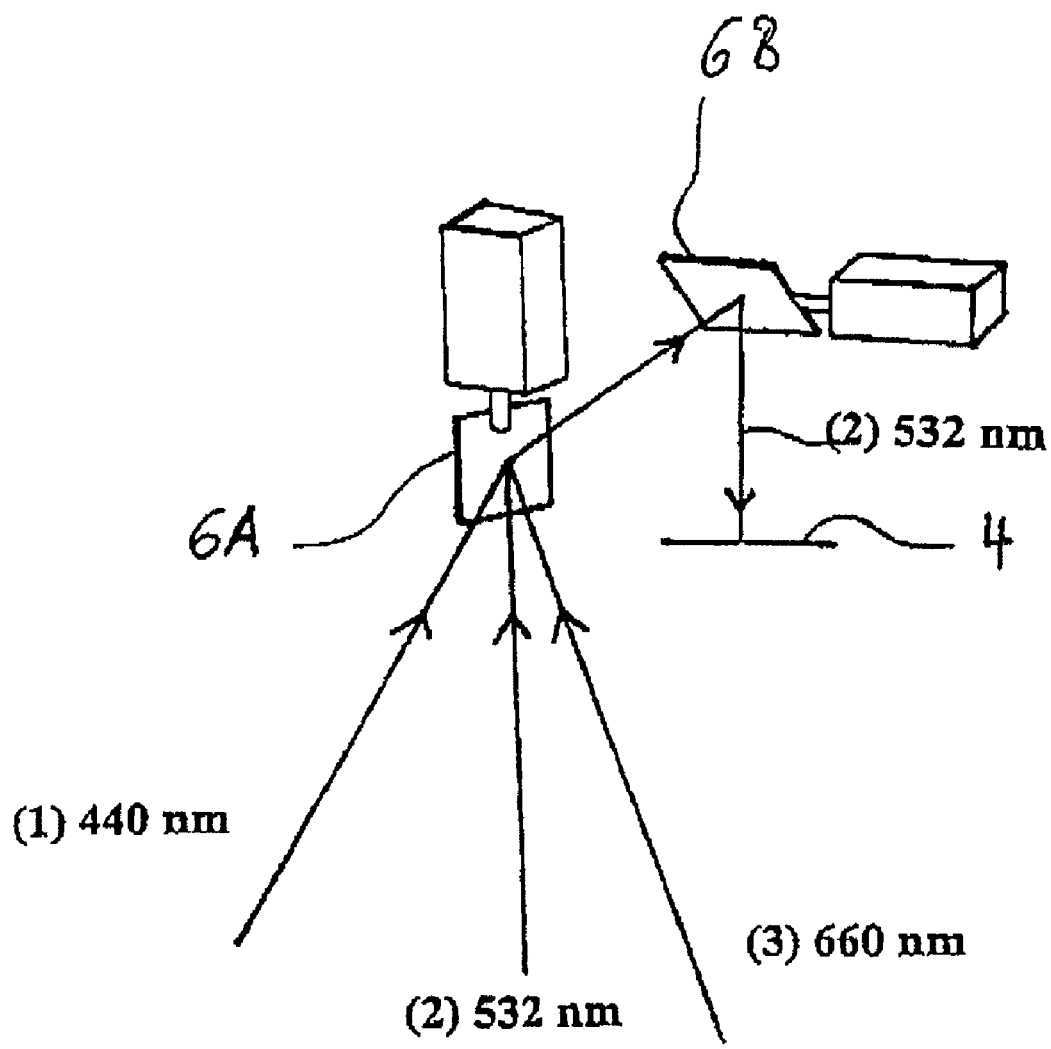
Figure 12:
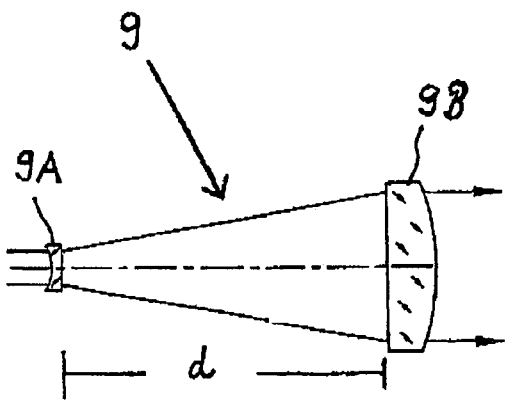
Figure 13:
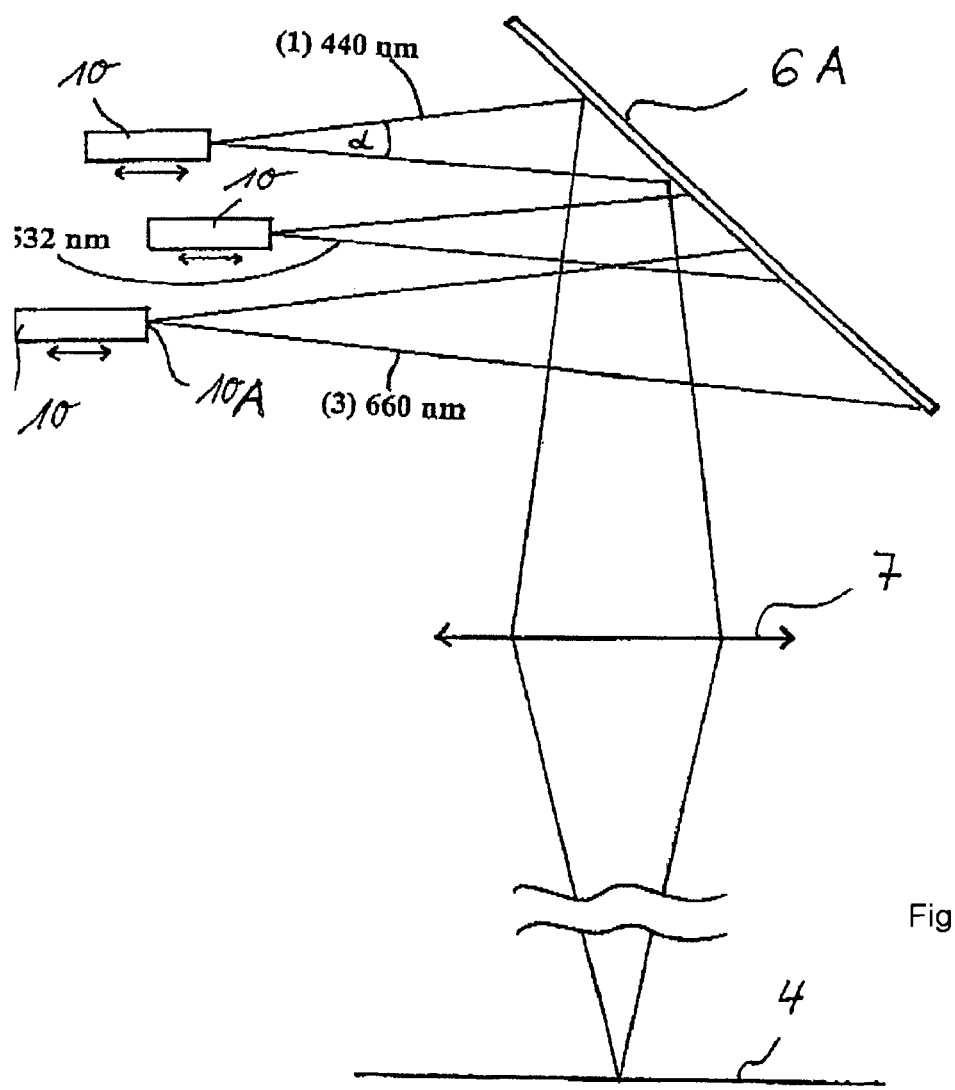
Figure 14:
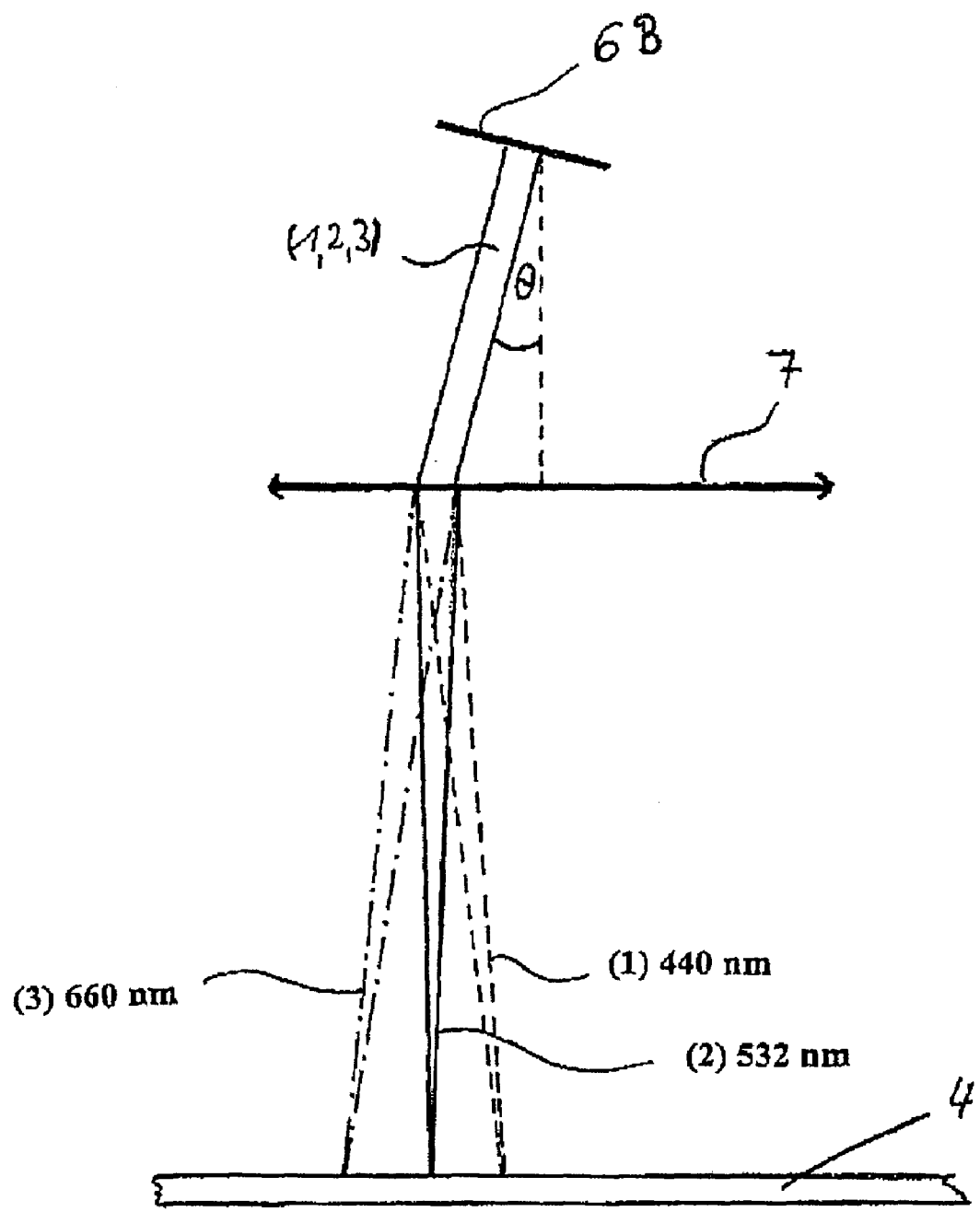
Figure 15:
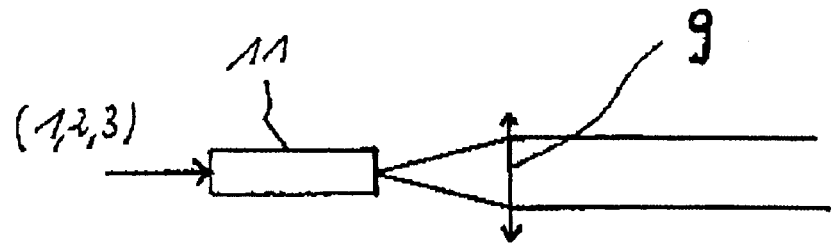
Figure 16:
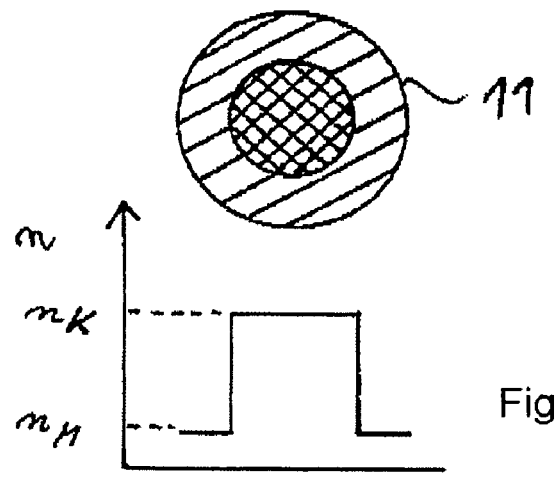
Figure 17:
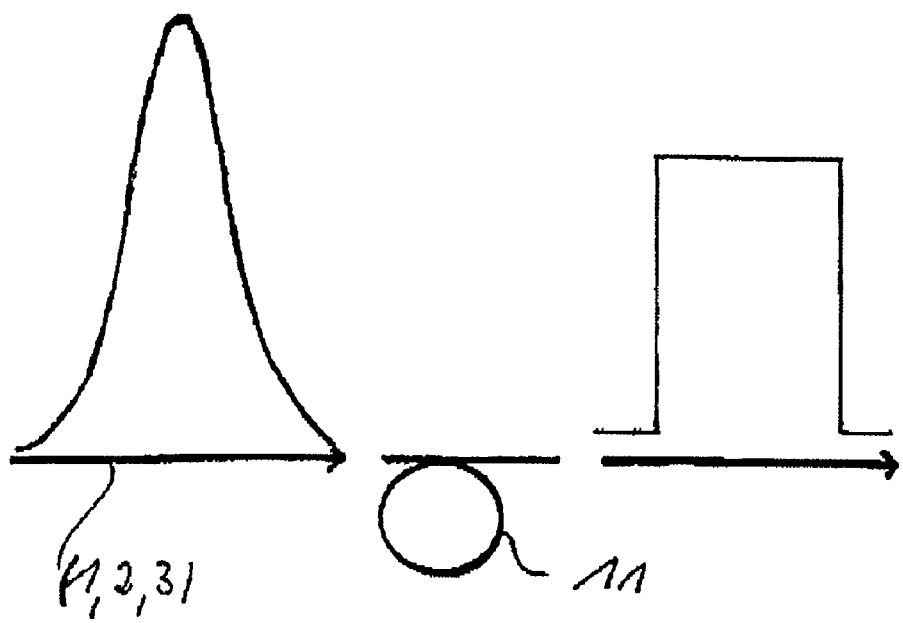
Figures 18, 19:
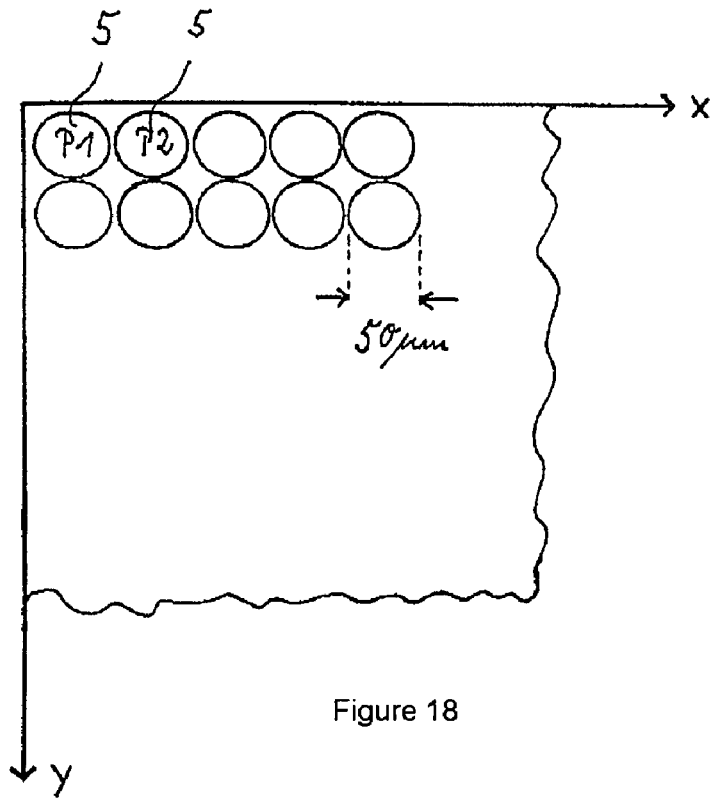

The invention is to be explained further below by using the appended drawings, in which:

FIG. 1 shows a real absorption graph for a layer in which there are various chromophoric particles that can be bleached by means of laser radiation, FIG. 2 shows an idealized absorption graph for a layer in which there are chromophoric particles that can be bleached by means of laser radiation, FIGS. 3–5 show bleaching graphs for three different chromophoric particles, FIG. 6 shows a first arrangement according to the method, FIG. 7 shows the beam course of two focused laser beams of different wavelengths in the area of the layer to be labeled, FIG. 8 shows a detailed representation of the first arrangement according to the method, FIG. 9 shows a second arrangement according to the method, FIG. 10 shows a third arrangement according to the method, FIG. 11 shows a fourth arrangement according to the method, FIG. 12 shows a lens system to compensate for the chromatic aberration of the focusing device parallel to the optical axis, FIG. 13 shows a fifth arrangement according to the method, FIG. 14 shows an illustration to explain the transverse chromatic error of the focusing device, FIG. 15 shows a stepped index fiber with a lens downstream of the output coupling end of the fiber, FIG. 16 shows a section through a stepped index fiber, with the course of the refractive index, FIG. 17 shows the beam course of a Gaussian beam before it is coupled into a stepped index fiber and after it is coupled out, FIG. 18 shows a plan view of the layer of the object to be labeled and having the pixels, FIG. 19 shows a table with control data for the method according to the invention.

FIG. 1 illustrates a real absorption spectrum of a layer of an object to be labeled according to the invention. In the following text, labeling is always also understood to mean the application of colored information. Contained in this layer are three chromophoric particles (also referred to as colorants), whose absorption behavior in the visible spectral range is different. The absorption bands are not separated ideally from one another. In the range in which the colorant 1 primarily absorbs, the colorants 2 and 3 also absorb—even if considerably less. In the range where the colorant 2 primarily absorbs, there is also a slight absorption for the colorants 1 and 3. Only in the range where the colorant 3 primarily absorbs is there barely any absorption from the two other colorants. One example for the colorant 1 is the pigment bearing the trade name Novoperm yellow HR 70 from the Clariant company. One example of the colorant 2 is the pigment bearing the trade name Hostaperm pink E from Clariant. One example of the colorant 3 is the pigment bearing the trade name Monastral blue FGX from Clariant.

What is common to these pigments is that they can be bleached under the influence of laser radiation. By means of wavelength-selective bleaching, it is in this way possible to set the color of the layer by means of subtractive color mixing. Each surface element of the layer, viewed statistically, has an equal distribution of the various chromophoric particles. On the one hand, the wavelengths which are used to bleach the individual colorants are matched to the absorption spectrum, on the other hand the colorants used and their composition are examined to see which laser wavelengths are most favorably available. The resulting color of the layer therefore depends on which colorants are used, with which laser wavelength and with which laser intensity bleaching is carried out in each case. The latter, the respective laser intensity, has a great influence on the level of bleaching. This is illustrated in FIGS. 3 to 5, where the bleaching graphs for three different colorants are represented. The dependence of the level of bleaching on the laser intensity is in this case different for each colorant. This circumstance is taken into account—as will be described further below—by means of special method control. Below a threshold intensity, no bleaching takes place at all. Above this threshold intensity, there is a region which is linear to a first approximation, which then changes to a saturation region. Above a specific laser intensity, the layer is then destroyed.

In the above example, laser beams with the following wavelengths were used: 440 nm, 532 nm and 660 nm. The laser beam at 532 nm is generated by means of an Nd-YAG laser, whose basic wavelength of 1064 nm is halved by means of frequency doubling. The laser beam at 660 nm is generated by means of an Nd-YAG laser whose basic wavelength of 1320 nm is halved by means of frequency doubling. The laser beam at 440 nm is generated by means of an Nd-YAG laser whose basic wavelength of 1320 nm is reduced to one third by means of frequency tripling. The types of frequency multiplication are known to those skilled in the art. These laser radiation sources run stably and supply adequate power.

However, the method according to the invention is not restricted to the use of laser beams having these wavelengths. The method according to the invention is not restricted to the methods of wavelength-selective bleaching either, but can also be applied to the laser irradiation of latent pigments and/or to labeling by means of laser-induced carbonization. The laser wavelengths have to be selected accordingly.

FIG. 6 shows a first arrangement according to the method. The beam guiding means (8) provided according to the invention has a first optically reflective element (8A), which reflects laser radiation of a first wavelength ($\lambda_1$) and transmits laser radiation having at least one second wavelength ($\lambda_2$, $\lambda_3$), the first laser beam (1) having the wavelength ($\lambda_1$) being reflected by the reflective element (8A) in the direction of the two-coordinate beam deflection device (6), at least one second laser beam (2) having a wavelength ($\lambda_2$) being transmitted through the reflective element (8A) onto the two-coordinate beam deflection device (6).

The optically reflective element (8A) is a dielectric mirror or a dielectric reflection prism (not illustrated). Dielectric mirrors or dielectric reflection prisms, which reflect radiation at a specific wavelength or a specific wavelength range and are otherwise at least partially transparent, are known to those skilled in the art. In this way, the first laser beam having a wavelength of 440 nm and a second laser beam having a wavelength of 532 nm, which are generated physically separated from each other, are guided onto one and the same two-coordinate beam deflection device (6). In this case, the second laser beam can be directed onto the first reflective elements (8A) directly or via a further reflective element (8B) —as illustrated. The reflection angle in the embodiment illustrated is 45°. However, other reflection angles are also provided, in each case the arrangement of the two-coordinate beam deflection device (6) and of the focusing device (7) being selected with regard to the relative position of the reflective element (8A) and with regard to the reflection angle. Downstream of the reflective element (8A), the two laser beams (1, 2) preferably run along one line. If a third laser beam having a wavelength of 660 nm is to be coupled in, the second laser beam is reflected by the second reflective element (8B) in the direction of the first reflective element (8A) and transmitted through the latter onto the two-coordinate beam deflection device (6). The third laser beam (3) having a wavelength ($\lambda_3$) is then transmitted through the first and second reflective element (8A, BB) onto the two-coordinate beam deflection device (6). For this purpose, the first and the second reflective elements (8A, BB) are at least partially transparent to the wavelength of the third laser beam. In this case, the third laser beam can be directed onto the second reflective element (BB) directly or by means of a further reflective element (8C)—as illustrated.

FIG. 8 shows a detailed illustration of the first arrangement according to the method. As can be seen, the laser beams experience a beam offset through the reflective elements (8A, BB). By means of appropriate setting of the points of incidence of the laser beams on the reflective elements, this beam offset is taken into account, so that the various laser beams subsequently run along one line. The reflective elements (8A, BB, 8C) can preferably be adjusted in terms of their position.

By using FIG. 7, the chromatic aberration of the focusing device (7) parallel to the optical axis (A) of the focusing device is to be explained. Here, this is a fundamental problem which arises when laser beams of different wavelengths are to be focused by one and the same focusing device (7). A focusing device (7) of this type is a lens or a lens system, preferably a planar field objective. Such a planar field objective has a chromatic aberration which presents problems when the object (4) to be labeled is acted on with laser radiation of a different wavelength. In this case, chromatic aberration is understood to mean that beams with a shorter wavelength are refracted more intensely than beams with a longer wavelength. This results in the focal length (f) being wavelength-dependent, the difference in focal length between a blue laser beam (440 nm) and a red laser beam (660 nm) quite possibly being 2 to 3 mm. The manufacturer's statements for wavelength-dependent focal length in this case always relate to laser beams with an identical beam characteristic (very low divergence and equal beam diameter) before focusing. The thickness of a typical plastic card is, for example, 0.8 mm. The difference in focal length is therefore already a multiple of the card thickness while the labeling according to the invention is intended to take place in a layer (4A) close to the surface. In FIG. 7, the distance from the planar field objective to the area (4A) to be labeled is chosen such that the focus for the laser radiation having the wavelength of 440 nm lies on the surface to be labeled. In this case, the laser spot at the focus is not arbitrarily small either, but, as a result of diffraction, has a finite size (typical value: 50 μm). Without further measures, the focus for the laser radiation having the wavelength of 660 nm then lies 2 to 3 mm under the card surface (4A). This in turn results in the laser intensity for the laser radiation having the wavelength 660 nm not being high enough on the card surface (4A) to achieve a color change. 2 to 3 mm above the focus, the beam diameter is about twice as large as at the focus, therefore the intensity there is only one quarter of the intensity at the focus. With most laser additives, a color change outside the focus therefore cannot be achieved, since there the laser intensity is lower than the threshold intensity.

In order to counter the problem described above of chromatic aberration, according to the invention a means (9) of compensating for the chromatic aberration is provided upstream of the focusing device (6) in the beam path of at least one laser beam having the wavelength ($\lambda$). This means (9) changes the beam characteristic of the laser beam or beams in such a way that they all have their focus in the area (4A) close to the surface of the object to be labeled. The following procedure is therefore used: the distance of the surface (4A) to be labeled from the planar field objective (6) is chosen such that, without any further means, the green laser beam having the wavelength of 532 nm has its focus on the area (4A) to be labeled. In order then that the two other laser beams also have their focus there, appropriate optically effective means (9) are inserted in their beam path. Which of the laser beams (1, 2, 3) is then looked for as a starting point for the choice of the planar field objective (6) and of the distance from the area (4A) to be labeled depends on the concrete conditions. However, for the other laser beam or for the respective other laser beams (1, 2, 3), appropriate means (9) are then needed to compensate for the chromatic aberration. Provision is also made to provide a means (9) to compensate for the chromatic aberration for each laser beam (1, 2, 3).

The means (9) to compensate for the chromatic aberration of the focusing device parallel to the optical axis (A) of the focusing device is preferably formed by a lens or a lens system. FIG. 12 shows such a lens system comprising a diverging lens (9A) and a converging lens (9B), the distance (d) between these two preferably being adjustable in order to provide the respective laser beam (1, 2, 3) with a different divergence. In this case, the respective laser beam first passes through the diverging less (9A) and then the converging lens (9B) before it is guided onward onto the two-coordinate beam deflection device (6) and the focusing device (7). In this way, for example, the blue laser beam (440 nm) is widened a little in the direction of the focusing device, while the red laser beam (660 nm) is focused a little in the direction of the focusing device. As a result of this measure, ultimately all three laser beams (red, green and blue) have their focus on the surface (4A) to be labeled.

The means (9) to compensate for the chromatic aberration may also be a glass fiber (11) and a converging lens (9) (cf. FIG. 15). For this purpose, the appropriate laser beam (1, 2, 3) for which compensation is to be carried out is led through a glass fiber (11), through which it then emerges again divergently. By means of the converging lens (9), it can then be focused again. By varying the distance between the fiber end and the converging lens (9), the position of the focus downstream of the focusing device (7) is also changed.

To compensate for the chromatic aberration, the distance between the end of the fiber (10A) and the two-coordinate beam deflection device (6) can also simply be set in each case (cf. FIG. 13). This shows how three laser beams (1, 2, 3) of different wavelengths are respectively directed via a glass fiber (10) onto a deflection mirror (6A) of the two-coordinate beam deflection device (6), the distances of the fiber ends (10A) from the deflection mirror (6A) being different. This achieves the situation where all the laser beams, in spite of different wavelengths, have a virtually common focus on the area (4A) to be labeled.

FIG. 9 shows a second arrangement according to the method, in which, as distinct from the arrangement from FIGS. 6 and 8, the three laser beams are not directed parallel to one another onto the beam guiding means (8A, 8B, 8C) according to the invention. In the arrangement illustrated in FIG. 9, one of the laser beams (3) originally runs at right angles to the two other laser beams (1, 2), which originally run parallel to and offset from each other. Here, the same dielectric mirrors (8A, 8B) are used which are also provided with the arrangement according to FIGS. 6 and 8.

FIG. 10 shows a fourth arrangement according to the method. In this case, the beam guiding means (8) has an optically reflective element (8D) whose position can be adjusted, preferably rotated, which reflects at least laser radiation of a first wavelength ($\lambda_1$) and laser radiation of a second wavelength ($\lambda_2$, $\lambda_3$), the first laser beam (1) having the wavelength ($\lambda_1$) and the second laser beam (2) having the wavelength ($\lambda_2$) striking the reflective element (8D) parallel to and offset from each other and/or at different angles, the reflective element (8D) being moved into a first position in order to reflect the first laser beam (1) having the wavelength ($\lambda_1$) in the direction of the two-coordinate beam deflection device (6), the reflective element (8D) being moved into a second position in order to reflect the second laser beam (2) having the wavelength ($\lambda_2$) in the direction of the two-coordinate beam deflection device (6).

In this case, the reflective element (8D) is a metallic mirror or a metal-silvered reflection prism.

A fifth arrangement according to the method is shown in FIG. 11. In this case, the beam guiding means (8) is a first rotatable, metallic deflection mirror (6A) of the two-coordinate beam deflection device (6), by means of which the first laser beam (1) having the wavelength ($\lambda_1$) and at least a second laser beam (2) having the wavelength ($\lambda_2$) are reflected in the direction of a second rotatable, metallic deflection mirror (6B) of the two-coordinate beam deflection device (6), which then reflects the laser beams in the direction of the focusing device (7) for focusing the laser radiation onto a layer (4A) of the object (4), the deflection mirror (6A) to act on the object (4) with the first laser beam (1) having the wavelength ($\lambda_1$) in each case being rotated by a first offset value, the deflection mirror (6A) to act on the object ( ) with the second laser beam (2) having the wavelength ($\lambda_2$) in each case being rotated by a second offset value.

FIG. 14 illustrates a further fundamental problem which occurs when it is wished to focus laser beams of different wavelengths through one and the same planar field objective (7) in order to label the surface (4A) of an object, for example a plastic card. This problem is based on the chromatic aberration of the planar field objective transversely with respect to the optical axis. This is understood to mean that laser beams of different wavelengths, which pass through the planar field objective at a specific angle (θ) to the optical axis (A) of the planar field objective (7) do not strike the same point on the area (4A) to be labeled—as desired—but are offset laterally with respect to one another. In particular in case of labeling the edge of the object (4), that is to say relatively far away from the optical axis (A) of the planar field objective (A), the lateral focus offset is particularly large. According to the invention, to compensate for the lateral chromatic aberration of the focusing device (7) for at least one laser beam having the wavelength ($\lambda$), during the rotational setting of the rotatable, metallic deflection mirror (6A, 6B) of the two-coordinate beam deflection device (6) to act on a layer (4A) of the object (4) in the vector and/or raster method, in each case a correction value ($\Delta x$, $\Delta y$) for the transverse chromatic error is taken into account.

The colored information to be applied comprises a large number of pixels (P), the object (4) being acted on with laser radiation in pulsed operation in order to produce the pixels (P). In order to produce the individual colored pixels (P), various procedures are provided in accordance with the invention.

In this case, acting on the object (4) point by point with the first laser beam (1) can be carried out with a first laser intensity value ($I^{(1)}$), while acting on the object (4) point by point with the second laser beam (2) is carried out with a second laser intensity value ($I^{(2)}$) and acting on the object (4) point by point with the third laser beam (3) is carried out with a third laser intensity value ($I^{(3)}$). Provision is also made, when acting on the object (4) point by point, to vary the laser intensity from pixel to pixel as well for at least one laser beam (1, 2, 3).

One procedure for generating the image according to the invention consists in firstly acting on all the pixels to be produced in the vector and/or raster method in each case one after another with the first laser beam (1), then acting on the pixels (P) in each case one after another with at least a second laser beam (2).

As an alternative to this, an action with laser beams of different wavelengths is in each case carried out one after another pixel by pixel.

Furthermore, provision is also made for an action with laser beams of different wavelengths in each case to be carried out simultaneously pixel by pixel.

The object (4) is preferably acted on with laser radiation in such a way that in each case a correction value for the transverse chromatic error is taken into account pixel by pixel.

The starting point for the method according to the invention is an image which is present in digital form (e.g. in the PCX format, as it is known) or is converted into such a form. In this case, an image is understood to mean both a photo and alphanumeric information, a barcode or the like. Starting from this digital image information, the x, y coordinates ($x_1$, $y_1$, $x_2$, $y_2$) for driving the two-coordinate beam deflection device (6) are then derived for each pixel (P1, P2, . . . ). In addition, by using the digital color information about the pixels, laser intensity values ($I_i^{(1)}$, $I_i^{(2)}$, . . . ) are derived for each pixel, in order that the correct level of bleaching and therefore the correct color impression of a pixel is achieved. Furthermore, a correction value ($\Delta x$, $\Delta y$) is generated for each pixel (x, y) to compensate for the lateral chromatic aberration. All this data can be stored, for example, in a table having control data for the method according to the invention (cf. FIG. 19).

Finally, a further problem is still to be discussed, which is of significance in particular in laser bleaching, as it is known. As can be gathered from FIGS. 3 to 5, the level of bleaching depends to a great extent on the respective laser intensity. However, it is now the case that the laser beams (1, 2, 3) used generally have a Gaussian beam profile (cf. FIG. 17), which is also present at the focus (laser writing spot). However, this means that the laser intensity in the laser writing spot is not constant. It is very high at the beam center, while it falls off sharply toward the edges. Uniform bleaching of a pixel cannot therefore be achieved. In the least favorable case, the intensity at the edges of the pixels is lower than the threshold value, so that no bleaching takes place at all there. In order to circumvent this problem, the laser beams (1, 2, 3) are according to the invention coupled into a stepped index fiber (11), as it is known. FIG. 16 shows a section through a stepped index fiber (11) and the rectangular course of the refractive index. A laser beam with a Gaussian profile coupled into the stepped index fiber (11), has a rectangular intensity distribution over its cross section after it has left the stepped index fiber (11) again. The beam profile of the laser is therefore, so to speak, an image of the course of the refractive index of the stepped index fiber. In this way, a laser beam with an intensity that is virtually constant over its cross section is made available, which is highly suitable for uniform bleaching of pixels.

The invention claimed is:

1. A method for applying colored information to an object, the object having at least two different chromophoric particles, at least in a layer close to a surface of the object, which change a color of this layer under the influence of laser radiation, comprising:

producing first and second laser beams having first and second different wavelengths ($\lambda_1$, $\lambda_2$) respectively, reflecting the first and second laser beams using a beam guiding means in order to guide the reflected first and second laser beams, without matching orthogonal polarization, to a two-coordinate beam deflection device, and so that the first and second laser beams are emitted from the two-coordinate beam deflection device on a common axis, and using a focusing device to focus the first and second laser beams emitted from the two-coordinate beam deflection device onto the layer of the object; and wherein the beam guiding means comprises a first rotatable, metallic deflection mirror of the two-coordinate beam deflection device, by means of which the first laser beam having the wavelength ($\lambda_1$) and at least the second laser beam having the wavelength ($\lambda_2$) are reflected in the direction of a second rotatable, metallic deflection mirror of the two-coordinate beam deflection device, which then reflects the laser beams in the direction of the focusing device for focusing the laser radiation onto a layer of the object, the first deflection mirror being rotated by a first offset value, and the second deflection mirror being rotated by a second offset value.

2. The method as claimed in claim 1, wherein the beam guiding means comprises a first optically reflective element, which reflects the first laser beam having the first wavelength ($\lambda_1$) and transmits the second laser beam having the second wavelength ($\lambda_2$), the first laser beam having the wavelength ($\lambda_1$) being reflected by the reflective element in the direction of the two-coordinate beam deflection device, and the second laser beam having a wavelength ($\lambda_2$) being transmitted through the reflective element onto the two-coordinate beam deflection device.

3. The method as claimed in claim 2, wherein the beam guiding means further comprises a second optically reflective element which reflects the second laser beam of the wavelength ($\lambda_2$) and transmits a third laser radiation having a third wavelength ($\lambda_3$), the first laser beam having the wavelength ($\lambda_1$) being reflected by the first reflective element in the direction of the two-coordinate beam deflection device, the second laser beam having the wavelength ($\lambda_2$) being reflected by the second reflective element in the direction of the first reflective element and being transmitted through the latter onto the two-coordinate beam deflection device, and the third laser beam having the wavelength ($\lambda_3$) being transmitted through the first and second reflective elements onto the two coordinate beam deflection device.

4. The method as claimed in claim 2, wherein the optically reflective element is a dielectric mirror.

5. The method as claimed in claim 2, wherein the optically reflective element is a dielectric reflection prism.

6. The method as claimed in claim 1, wherein the beam guiding means comprises an optically reflective element whose position can be adjusted, and which reflects the first laser beam having the first wavelength ($\lambda_1$) and the second laser beam having the second wavelength ($\lambda_2$), the first laser beam having the wavelength ($\lambda_1$) and the second laser beam having the wavelength ($\lambda_2$) striking the reflective element parallel to and offset from each other and/or at different angles, the reflective element being moved into a first position in order to reflect the first laser beam having the wavelength ($\lambda_1$) in the direction of the two-coordinate beam deflection device, the reflective element being moved into a second position in order to reflect the second laser beam having the wavelength ($\lambda_2$) in the direction of the two-coordinate beam deflection device.

7. The method as claimed in claim 6, wherein the optically reflective element is a metallic mirror.

8. The method as claimed in claim 6, wherein the optically reflective element is a metallic reflection prism.

9. The method as claimed in claim 1, wherein the focusing device for focusing the laser radiation onto a layer of the object is a lens or a lens system.

10. The method as claimed in claim 1, further comprising a means to compensate for the chromatic aberration of the focusing device parallel to the optical axis of the focusing device provided in the beam path of at least one laser beam having the wavelength ($\lambda$), upstream of the focusing device for focusing the laser radiation onto the layer of the object.

11. The method as claimed in claim 10, wherein the means to compensate for the chromatic aberration of the focusing device parallel to the optical axis comprise an adjustable lens in the beam path or an adjustable lens system.

12. The method as claimed in claim 10, wherein to compensate for the chromatic aberration of the focusing device parallel to the optical axis (A), a fiber optic unit, through which the laser beam is guided, is provided in the beam path of at least one laser beam having the wavelength ($\lambda$), the optical path between the output coupling end of the fiber and the focusing device being adjustable.

13. The method as claimed in claim 1, wherein to compensate for the chromatic aberration of the focusing device transversely with respect to the optical axis (A) of the focusing device for at least one laser beam having the wavelength ($\lambda$), during the rotational setting of a rotatable, metallic deflection mirror of the two-coordinate beam deflection device to act on a layer of the object in the vector and/or raster method, in each case a correction value ($\Delta x$, $\Delta y$) for the transverse chromatic error is taken into account.

14. The method as claimed in claim 1, wherein for at least one of the first and second laser beams, a stepped index fiber is provided in the beam path upstream of the two-coordinate beam deflection device, the laser beam coupled into the stepped index fiber having a Gaussian beam profile and the laser beam coupled out of the stepped index fiber having a rectangular beam profile.

15. The method as claimed in claim 1, wherein the colored information to be applied comprises a large number of pixels (P), and laser radiation is pulsed to produce the pixels, the first laser beam having the wavelength ($\lambda_1$) having a first laser intensity value ($I^{(1)}$), and the second laser beam having the wavelength ($\lambda_2$) having a second laser intensity value ($I^{(2)}$).

16. The method, as claimed in claim 15, wherein the object is acted on with laser radiation to produce the pixels in such a way that, for at least one laser beam of wavelength ($\lambda$), the laser intensity is varied from pixel to pixel.

17. The method as claimed in claim 15, wherein the object is acted on with laser radiation to produce the pixels in such a way that in each case an action with laser beams of different wavelengths is carried out one after another pixel by pixel.

18. The method as claimed in claim 15, wherein the object is acted on with laser radiation to produce the pixels (P) in such a way that in each case an action with laser beams of different wavelengths is carried out simultaneously pixel by pixel.

19. The method as claimed in claim 15, wherein the object is acted on with laser radiation to produce the pixels in such a way that in each case a correction value for the transverse chromatic error is taken into account pixel by pixel.

20. The method as claimed in claim 1, wherein the object is acted on with laser radiation to produce the pixels (P) in such a way that first all the pixels to be generated are in each case acted on one after another with the first laser beam having the wavelength ($\lambda_1$) in a vector and/or raster method, then the pixels (P) to be generated are in each case acted on one after another with at least the second laser beam having the wavelength ($\lambda_2$) in the vector and/or raster method.

* * * * *